US006407186B1

(12) United States Patent
Rath et al.

(10) Patent No.: US 6,407,186 B1
(45) Date of Patent: Jun. 18, 2002

(54) METHOD FOR PRODUCING LOW-MOLECULAR, HIGHLY REACTIVE POLYISOBUTYLENE

(75) Inventors: Hans Peter Rath, Grünstadt; Ulrich Kanne, Frankenthal, both of (DE); Frans van Deyck, Essen (BE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/581,154

(22) PCT Filed: Nov. 11, 1998

(86) PCT No.: PCT/EP98/08099

§ 371 (c)(1),
(2), (4) Date: Jun. 12, 2000

(87) PCT Pub. No.: WO99/31151

PCT Pub. Date: Jun. 24, 1999

(30) Foreign Application Priority Data

Dec. 12, 1997 (DE) .......................... 197 55 322

(51) Int. Cl.[7] .......................... C08F 4/14; C08F 110/10
(52) U.S. Cl. .......................... 526/69; 526/65; 526/207; 526/209; 526/212; 526/237; 526/348.7
(58) Field of Search .......................... 526/65, 69, 237, 526/348.7, 207, 209, 212

(56) References Cited

U.S. PATENT DOCUMENTS 4,152,499 A 5/1979 Boerzel et al.
4,227,027 A * 10/1980 Booth et al. ................ 585/465

FOREIGN PATENT DOCUMENTS

| CA | 2217848 | 12/1996 |
| DE | 27 02 604 | 7/1978 |
| EP | 0 145 235 | 6/1985 |
| EP | 0 322 241 | 6/1989 |
| EP | 0 481 297 | 4/1992 |
| EP | 0 742 191 | 11/1996 |
| MY | 9704367 | 9/1997 |
| WO | WO 93/10063 | 5/1993 |
| WO | WO 96/40808 | * 12/1996 |

OTHER PUBLICATIONS

H. Süterbock, Polyisobutylen Uno Misch Polymerisate, pp. 77 to 108, "Herstellung Hochmolekularer polyisobutylene", 1959.
J. Draxter, et a.,Chem. Ing. Tech., Übersichtsbeiträge, vol. 62, No. 7, pp. 525 to 530, "Auslegungskriterien Für Elektrostatische Emulsionsspaltanlagen", 1990.
I. Puskas, et al., J. Polymer Sci.: Symposium, No. 56, pp. 191 to 202, "The Nature of the Double Bond in Low Molecular Weight Polyisobutylenes and "Polybutne" Copolymers", 1976.

* cited by examiner

Primary Examiner—Fred Teskin
(74) Attorney, Agent, or Firm—Oblon, Spivak, McClelland, Maier & Neustadt, P.C.

(57) ABSTRACT

A process for preparing low molecular weight, highly reactive polyisobutylene having an average molecular weight $M_n$ of from 500 to 5000 Dalton and a terminal double bond content of more than 80 mol % by polymerization in the liquid phase of isobutene or hydrocarbon streams comprising isobutane [sic] with the aid of a boron trifluoride complex catalyst at from −40 to 20° C. and at from 1 to 20 bar comprises a) polymerizing until the residual isobutene content of the reaction mixture is less than 2% by weight, based on isobutene introduced, or removing residual isobutene towards the end of the polymerization until the residual isobutene content is less than 2% by weight, b) enriching the boron trifluoride complex catalyst which is obtained in the form of droplets in the disperse and/or coherent phase, c) recycling the complex-enriched phases to the polymerization and d) compensating for catalyst losses by adding boron trifluoride and, if necessary, complexing agents.

13 Claims, 1 Drawing Sheet

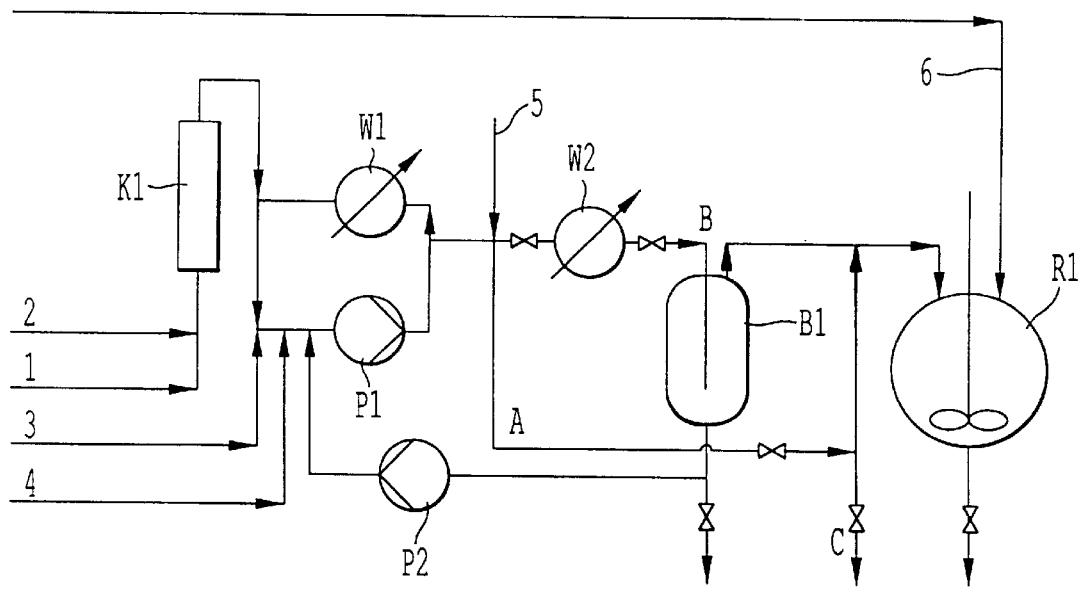

METHOD FOR PRODUCING LOW-MOLECULAR, HIGHLY REACTIVE POLYISOBUTYLENE

BACKGROUND OF THE INVENTION

1. Field of the Invention

The present invention relates to a process for preparing low molecular weight, highly reactive polyisobutylene in the liquid phase using a boron trifluoride complex catalyst, the polymerization being conducted such that, at the end of the polymerization, the residual isobutene content is less than 2% by weight, the complex catalyst is removed and recycled to the polymerization.

2. Discussion of the Background

Low molecular weight and high molecular weight polyisobutenes having molecular weights of up to several 100,000 Dalton have long been known and their preparation is described, for example, in H. Güterbock: Polyisobutylen und Mischpolymerisate, pages 77 to 104, Springer, Berlin 1959. The currently available polyisobutenes of this molecular weight range are mainly prepared with the aid of Lewis acid catalysts, such as aluminum chloride, alkylaluminum chlorides or boron trifluoride, and generally have a molecular weight distribution (polydispersicity [sic]) of from 2 to 7.

A distinction must be made between these conventional polyisobutenes having average molecular weights of from 500 to 5000 Dalton and the highly reactive polyisobutenes, which typically have a high vinylidene group content of preferably substantially more than 60 mol % and a polydispersity $\overline{M}_w/\overline{M}_n$ of less than 2. Such highly reactive polyisobutenes are used as intermediates for the preparation of additives for lubricants and fuels, as described for example, in DE-A 27 02 604. For the preparation of these additives, alternating copolymers, in particular polyisobutenylsuccinic anhydrides, are first produced by reacting the terminal double bonds of the polyisobutene with maleic anhydride, and said copolymers are then reacted with certain (poly) amines and/or alcohols to give the finished additive. Since the vinylidene double bonds are preferred reaction sites in the ene reaction with maleic anhydride, whereas, depending on their position in the macromolecule, the double bonds present further in the interior of the macromolecules lead to substantially lower, if any, conversion without the addition of halogens, the amount of terminal double bonds in the molecule is the most important quality criterion for this type of polyisobutene.

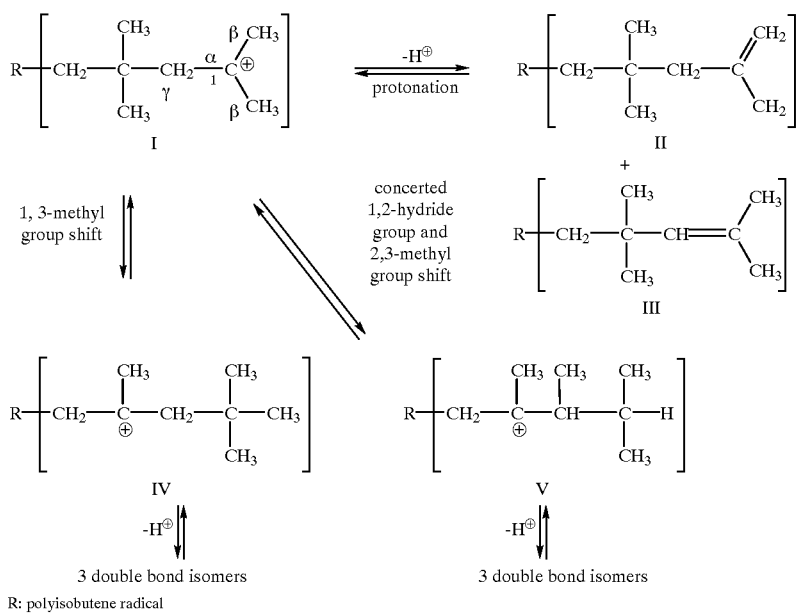

3 double bond isomers  3 double bond isomers
R: polyisobutene radical

The polyisobutene cation I formed in the course of the polymerization reaction may be converted into the corresponding polyisobutene by elimination of a proton. The proton may be eliminated from one of the β-methyl groups or from the internal γ-methylene group. Depending on which of these two positions the proton is eliminated from, a polyisobutene having a vinylidene double bond II or having a trisubstituted double bond III present close to the end of the molecule is formed.

The polyisobutene cation I is relatively unstable and attempts to achieve stability by rearrangement to form more highly substituted cations, if the acidity of the catalyst system is high enough. Both 1,3-methyl group shifts to give the polyisobutene cation IV and successive or concerted 1,2-hydride group and 2,3-methyl group shifts to give the polyisobutene a cation V may take place. Depending on the position from which the proton is eliminated, in each case three different polyisobutene double bond isomers can form from the cations IV and V. However, it is also possible for the cations IV and V to undergo further rearrangement, causing the double bond to migrate further into the interior of the polyisobutene macromolecule.

All these deprotonations and rearrangements are equilibrium reactions and therefore reversible, but in the end the formation of more stable, more highly substituted cations and hence the formation of polyisobutenes having an internal double bond with establishment of the thermodynamic equilibrium is preferred. These deprotonations, protonations and rearrangements are catalyzed by any traces of acid present in the reaction mixture, but in particular by the actual Lewis acid catalyst required for catalyzing the polymerization. Because of these facts and since only polyisobutenes having vinylidene double bonds according to formula II react very well with maleic anhydride with adduct formation, polyisobutenes of the formula III have in comparison substantially lower reactivity and other polyisobutenes having more highly substituted double bonds enter into the ene reaction with maleic anhydride virtually only under isomerizing conditions, the continued efforts of many research groups to find improved processes for the preparation of highly reactive polyisobutenes having higher and higher contents of terminal double bonds is understandable.

The preparation of low molecular weight, highly reactive polyisobutene from isobutene or hydrocarbon streams comprising isobutene, in particular from $C_4$ cuts, substantially free from 1,3-butadiene originally present therein, from steam crackers, FCC crackers (FCC: Fluid Catalyzed Cracking), i.e. $C_4$ raffinates, is known from a number of patents, for example from EP-A 145 235, EP-A 481 297, DE-A 27 02 604, EP-A 628 575, EP-A 322 241 and WO 93/10063. All these processes relate to the polymerization of isobutene in a single polymerization stage.

A further improvement is provided by the two- or multi-stage process of WO 96/40808, which comprises carrying out the polymerization reaction in at least two polymerization stages, the added isobutene at a substantially constant isobutene concentration being polymerized to a partial conversion of up to 95% in the first polymerization stage and the polymerization of the remaining isobutene being continued in one or more subsequent polymerization stages, without or after prior isolation of the polyisobutene formed in the first polymerization stage.

In addition to the efforts to optimize the process as described in the abovementioned publications, it was also attempted to recover $BF_3$ for economic and ecological reasons. Thus, EP-A 0 742 191 suggests the thermal decomposition of the $BF_3$ complex in the product stream and the absorption of the liberated $BF_3$, for re-use, in an olefin stream comprising a promoter.

This process has the disadvantages that the product of value is subjected to thermal stress in the presence of the catalyst which results in isomerization of the vinylidene double bond to give the more highly substituted double bond type, and that the wastewater is polluted by the complexing agent. The suggested method is not practical for the preparation of reactive polyisobutenes.

SUMMARY OF THE INVENTION

It is an object of the present invention to provide a process which makes it possible to prepare highly reactive polyisobutylene and to recycle the catalyst.

We have found that this object is achieved by a process for preparing low molecular weight, highly reactive polyisobutylene having an average molecular weight $M_n$ of from 500 to 5000 Dalton and a terminal double bond content of more than 80 mol % by polymerization in the liquid phase of isobutene or hydrocarbon streams comprising isobutene with the aid of a boron trifluoride complex catalyst at from −40 to +20° C. and at from 1 to 20 bar, which comprises a) polymerizing until the residual isobutene content of the reaction mixture is less than 2% by weight, based on the total amount of streams introduced, or removing residual isobutene towards the end of the polymerization until the residual isobutene content is less than 2% by weight, b) enriching the boron trifluoride complex catalyst which is obtained here in the form of droplets in the disperse and/or coherent phase, c) recycling the complex-enriched phases to the polymerization and d) compensating for catalyst losses by adding boron trifluoride and, if necessary, complexing agents.

BRIEF DESCRIPTION OF DRAWINGS

FIG. 1 shows a reactor for the preparation of polyisobutylene.

DETAILED DESCRIPTION OF THE INVENTION

The polymerization can be carried out in the presence or absence of solvents. Solvents used are generally hydrocarbons, e.g. butane, pentane, heptane, octane, which can be employed in pure form or in the form of technical grade mixtures.

To achieve as far as possible a quantitative separation of the complex, preference is given to using complexes having a limited solubility and/or cooling down the reaction mixture to, for example, from 5 to 30° C. below the temperature of the reactor, preferably by from 10 to 20° C.

For the purposes of the present invention, complexes having limited solubility are complexes having a solubility in, for example, 1:1 hexane/polyisobutene at −15° C. of from 0.1 to 10 g/l, preferably from 0.3 to 3 g/l.

Complexes having a limited solubility may be obtained by the choice of the complexing agent. For instance, a methyl tert-butyl ether complex is less soluble than the isopropyl tert-butyl ether and a methanol complex is less soluble than an isopropanol complex. It is also possible to achieve an appropriate solubility by mixing the complexing agents. Furthermore, water released by incomplete drying of the isobutene feed, especially the fresh isobutene feed (the recycled isobutene is generally dried) and/or by secondary reactions, such as dehydration of the alcohol cocatalyst or cleavage of any alkyl ethers used as cocatalysts, may form a $BF_3$/water complex which accumulates owing to the recycling. The degree of separation is generally determined by these amounts of water. The solubility of the $BF_3$ complex is also reduced by methanol, hydrofluoric acid, formic acid, formaldehyde and acetaldehyde. Preference is given to using boron trifluoride complexes or complex mixtures with water, methanol, ethanol, n- or isopropanol, 2-butanol or tert-butanol or the tert-butyl ethers thereof, particular preference being given to boron trifluoride complexes with methanol, ethanol, n- or isopropanol, 2-butanol or the tert-butyl ethers thereof.

In any case, the polymerization continues during separation of the $BF_3$ complex from the polymerization mixture, and, depending on polymer and isobutene concentration, the polyisobutene formed may be unfavorably altered with respect to molecular weight, molecular weight distribution and reactivity. The separation is therefore conducted at low isobutene concentrations, i.e. less than 2% by weight, preferably less than 1% by weight, based on the total amount of streams introduced, so that the properties of the resulting polymer are not significantly altered.

For this reason, stage (a) of the invention is preferably operated in the multi-stage mode of the polyisobutene process described in WO 96/40808, where residual isobutene from the main reactor is consumed in the post-reactor to a level of about 0.5%. With homogeneous catalysis in the main reactor, there is also increased complex separation by the cooled post-reaction. The solubility of the complex is reduced by almost one power of ten, especially if the temperature is also reduced.

Since separation of some of the very finely divided complex droplets of the resulting emulsion is quite difficult, the emulsion should have a low viscosity. An advantageous technical solution is provided by coalescing filters or separators including large-volume separators. In this way, from 40 to 95% of the catalyst can be separated without problems and returned to ink the reactor.

If the complex has a particularly high separation rate and the reactor feeds are dried incompletely, a partial discharge of, for example, from 10 to 30% of the separated complex may be necessary. If this is to be avoided, it is advisable to dry the reactor feeds over a 3 Å molecular sieve at advantageously from 3 to 5° C.

It is also possible to control the isobutene concentrations according to the invention by flashing the reactor effluent. This involves flashing the polymerization mixture at below 0° C., generally at the reactor temperature, into a flash vessel which has a pressure lower than that in the polymerization reactor which is generally from 1 to 20 bar abs, preferably from 1 to 10 bar, particularly preferably from 1 to 6 bar. The pressure in the flash vessel is generally 1–100 mbar, preferably 5–50 mbar, particularly preferably 10–30 mbar abs. The pressure in the flash vessel is controlled so as to achieve the desired residual isobutene concentration. The vapors usually have an acid number (AN) in accordance with DIN 53402 in mg of KOH/g of substance of up to 1.0 and are generally condensed at low temperatures, preferably at the reactor temperature, and recycled to the reactor. Owing to the relatively low temperature and the relatively low isobutene content, a water-containing complex precipitates in the bottom product of the flash evaporation which is separated in a phase separator and/or coalescer and recycled to the reactor.

In a particular embodiment, the present process is an emulsion polymerization. In emulsion polymerization, the complex is no longer completely soluble in the reaction mixture even at the start of the polymerization. Undissolved complex droplets generally increase the formation of oligomers (distillate yield) unless the undissolved complex droplets are very well dispersed. Such a dispersion of the undissolved catalyst droplets is achieved, for example, by means of a circulating pump in a high-output loop reactor as described in U.S. Pat. No. 5,286,823. Toothed-wheel mixers or other devices having a high energy input are also suitable.

After the reaction, the droplets are separated in separators, with or without using coalescing aids. In many cases, a complex separation and recycle of up to 95% is achieved.

However, preference is given to homogeneous polymerization. Specifically, the homogeneous polymerization is conducted in the liquid phase with the aid of a boron trifluoride complex catalyst at from −40 to 20° C., preferably at from −30 to 10° C., especially at from −20 to 0° C., and generally at from 1 to 20 bar, preferably at from 1 to 10 bar, especially at from 1 to 6 bar, in a manner known per se, e.g. according to U.S. 5,408,018 and 5,286,823, which are incorporated herein by reference.

The preferred operating procedure for stage (a) of the process of the invention is, as mentioned above, the multistage method described in WO 96/40808.

In its simplest embodiment, the polymerization according to this method is operated in two polymerization stages. Various methods can be adopted in order to obtain high terminal double bond contents of the polyisobutene and a low fluorine content of the washed polymer solution.

For example, it is possible to establish an isobutene conversion of from 5 to 98%, preferably from 50 to 95%, in particular from 50 to 90%, in the first polymerization stage and to complete the polymerization in the second stage.

The second polymerization stage is advantageously operated at the same or a lower polymerization temperature than the first polymerization stage, the temperature difference usually being from 0 to 20° C., preferably from 0 to 10° C.

Since the polymerization of the isobutene is exothermic, the polymerization temperature in the first polymerization stage is controlled, at a predetermined coolant temperature (the coolant is advantageously liquid ammonia, but other coolants, such as liquid sulfur dioxide or aqueous salt solutions or alcohol/water mixture can also be used), by the reactivity of the catalyst complex used, i.e. by the addition of complexing agent at a rate such that said polymerization temperature remains essentially constant, apart from technically unavoidable fluctuations or sudden variations in concentration at the points of introduction. The isobutene conversion in the first polymerization stage is controlled by adjusting the reactivity of the catalyst complex via metering of the complexing agent, taking into account the abovementioned parameters, i.e. coolant temperature, polymerization temperature and an average residence time of the reaction mixture in the reactor.

The discharge from the first polymerization stage is preferably passed directly into the second polymerization stage. Here, the polymerization is carried out, without the addition of fresh isobutene, preferably at a lower polymerization temperature than that in the first polymerization stage. This can be effected by means of a lower coolant temperature or with the use of a coolant at the same temperature as in the first polymerization stage, for example with the use of cooling apparatus used there, by controlling the cooling in such a way that the quantity of heat removed from the polymerization mixture is greater than the quantity of heat released there in the polymerization of the remaining isobutene. Under certain circumstances, it may be necessary or advantageous to replenish or to activate the complex which is more inactive as a result of lower temperatures by adding boron trifluoride so that the polymerization does not stop prematurely. This addition of boron trifluoride can be carried out before or after the introduction of the polymerization mixture into the second polymerization stage. The separation of the complex is improved by subsequent activation without deterioration in product quality.

With adjustment of an isobutene conversion of from 50 to 90%, the residence time of the polymerization mixture in the first polymerization stage is usually from 5 to 60 minutes, but may be shorter or longer depending on whether a very active or a less active catalyst is used. In the second polymerization stage, a residence time of from 1 to 180, preferably from 2 to 120, minutes is generally established. In the second polymerization stage, the isobutene conversion is generally adjusted such that the total conversion of the isobutene in the first and second polymerization stages is in general from 80 to 100%, preferably from 90 to 100%, in particular from 95 to 100%.

If the polymerization mixture in the second stage contains more than 2% by weight of isobutene, based on the isobutene introduced into the first stage, the unconverted isobutene can alternatively be fed, together with the polymerization discharge from the second polymerization stage, without further working up, to a third polymerization stage and further polymerized there, at a polymerization temperature which is lower than that in the second polymerization stage, to give an isobutene content of less than 2% by weight. In general, the polymerization temperature established in such a third polymerization stage is from 0 to 20° C., preferably from 0 to 10° C., lower than the polymerization temperature in the preceding second polymerization stage. The polymerization temperature can be established using the measures described above for establishing the polymerization temperature in the second polymerization stage. The residence time of the polymerization mixture which is established in the third polymerization stage depends on the catalyst activity and on the desired conversion and is generally from 2 to 180, preferably from 10 to 120, minutes. As stated in the explanation for carrying out the second polymerization stage, it may be necessary or advantageous to increase the catalyst activity by adding boron trifluoride. The pressure in the second and, if appropriate, third polymerization stage is generally from 1 to 20 bar, preferably from 1 to 10 bar, especially from 1 to 6 bar.

Although the use of second and third polymerization stages is advantageous also when pure isobutene is used in the polymerization, it proves to be particularly advantageous when $C_4$-hydrocarbon streams comprising isobutene, such as $C_4$ raffinates or $C_4$ cuts from the dehydrogenation of isobutene, are used as starting material in the process of the invention, since, as a result of said hydrocarbon streams, isobutene losses are avoided, there is no increase in the level of undesirable hydrocarbons due to recycling of unconverted isobutene comprising other hydrocarbons into the first polymerization stage and consequently a high-quality, virtually fluorine-free, low-isobutene raffinate II is obtained in addition to polyisobutene (PIB) having a high terminal double bond content. The polymerization discharge from the third stage can be worked up in the same way as that described for working up the discharge from the second polymerization stage.

As regards details on the implementation of the multi-stage polymerization, reference is made to WO 96/40808, which is therefore incorporated herein by reference. Stage (b) comprises the enrichment of the catalyst complex which is precipitated in the form of droplets and which first forms as a disperse phase. In general, some of these disperse droplets quite quickly also form a coherent phase which comprises solvent, isobutene and lower oligomers and sometimes also dispersed polymer. The complex droplets have a significantly higher density than the polymer solution and, when the droplets are sufficiently large, a coherent complex phase is quickly formed as the lower layer in separators or collecting tanks. In terms of shape and equipment, the tanks are preferably adapted to the problem to be solved, i.e. they are provided, in the lower part, with an interfacial layer measuring device and a teat or taper related to the amount of complex separated per unit time. Owing to the risk of side reactions, the coherent complex phase preferably has a volume corresponding to the complex consumption in the polymerization of at most 1–3 hours.

However, a greater or lesser fraction of the complex droplets is so small that the separation may be improved by longer residence times of the upper phase high in polymer and low in complex or other technical devices. Different residence times for the upper and lower phases are controlled via the position of the interfacial layer, whereas the residence time itself is controlled via the size of the tank, the amounts of feed added and the position of any liquid level. Typical devices for increasing the size of the complex droplets and consequently for improved separation are coalescers, i.e. filtering devices which convert the small, hydrophilic complex droplets into larger complex droplets via pore diameter and/or hydrophilic filter material. Commonly used hydrophilic filter materials are glass fibers, phenolic resins or phenolic resin coatings, but acrylonitrile fibers or coatings can also be used here, although they have another function or effect at this point than in the adsorption described below. Said coalescence is often facilitated by a separator, in this case a hydrophobic filtration. A hydrophobic filter material, if necessary in combination with a narrow pore diameter, prevents the passage of finely dispersed catalyst droplets.

As a result of such a treatment, the upper phase high in polymer is generally homogeneous and only contains soluble complex fractions. However, at prolonged residence times following this treatment, post-reaction may again lead to turbidity, i.e. the formation of a disperse complex phase. However, the complex separation is generally immediately followed by an extraction to remove soluble complex. However, in a particularly preferred embodiment, the dissolved complex is adsorbed on nitrile-containing materials, for example as described in EP 791 557, or on nitrile-modified silica gel. Preference is given to using the nitrile-containing polymers in fiber form, for example polyacrylonitrile fibers, since a high surface area can be obtained by a corresponding spinning process.

The complex catalyst is liberated from the loaded nitrile-containing materials by thermal treatment and recycled to the polymerization.

As an alternative to enriching or separating the complex droplets by means of the abovementioned filtering devices, the disperse complex droplets can be coalesced and thus enriched in the coherent phase and separated by means of electrostatic coalescers as described, for example, in Chem. Ing. Techn. 62 (1990) 525. Such a process is described in Malaysian patent application PI 9704367 for the separation of ionic cobalt salts from hydroformylation mixtures of polyisobutene. It was surprising that this separation can also be effected with the boron trifluoride complexes used in the process of the present invention, since these complexes are electrically neutral.

However, the formation of a coherent phase comprising the catalyst complex is not strictly necessary for recycling. Additional recycling to the reactor of a phase in which the complex is still dispersed is also possible, if desired. In this case, the separator is not operated with an interfacial layer, and a partial polymer recycle into the reactor is accepted.

According to stage (c) the enriched and/or separated catalyst complex is then recycled, usually without further purification, to the polymerization, in the case of a multi-stage polymerization generally into the first stage. It is generally possible to recycle from 70 to 90% of the catalyst complex.

Even if the catalyst complex is virtually completely recycled, there is some loss of activity, which is compensated for by adding small amounts of $BF_3$ catalyst, for example from 1 to 30, preferably from 3 to 20, in particular from 5 to 10, % by weight, based on the proportion of $BF_3$ complex needed in straight passage, and boron trifluoride. The proportion of complexing agent depends on the complex losses and may possibly be less than the stoichiometric amount or even fall to zero, if the hydrocarbon starting material comprises, for example, complexing agents such as methanol which are not held back by the upstream molecular sieve.

It was surprising that recycling of all the complex including the less preferred complexing agents water or methanol and not only recycling of the boron trifluoride set free from the complex is possible without adversely affecting the properties of the polyisobutene prepared with it.

EXAMPLE 1

The reactor W1 according to FIG. 1 consists of a Teflon tube which has a length of 7.6 m and an internal diameter of 4 mm and via which 50 l/h of reactor content are circulated by means of a gear pump P1. The tube and pump have a capacity of 100 ml. The Teflon tube and pump head are immersed in a cold bath at −19° C. (Kryostat). Isobutene (line 1) and n-hexane (line 2) are used as feed, at a rate of 140 g/h of isobutene and 160 g/h of hexane. The feed is dried over a 3 Å molecular sieve to a water content of less than 3 ppm (K1) and fed to the loop reactor through a capillary which has an internal diameter of 2 mm and is precooled to −19° C. $BF_3$ (line 3) and isopropanol as complexing agent (line 4) are directly introduced into the loop reactor. The amounts of $BF_3$ and isopropanol are varied until a molecular weight $M_N$ of 1000 is obtained at an isobutene conversion of 90%. The amount of $BF_3$ added in the steady state is 10 mmol/h and the amount of isopropanol added is 13.5 mmol, at a reactor temperature of −13° C.

The isobutene conversion is determined by gas chromatography using n-hexane as reference. The feed, the reactor volume and the volume contraction due to polymerization give an average residence time of 13 minutes. The polymerization is terminated with 15 ml/h of acetonitrile (line 5) immediately after the pressure regulation means.

The pressure conditions in the reactor are determined by its geometry, the amount circulated, the viscosity of the reaction mixture and the pressure regulation. The pressure regulation means directly at the reactor outlet on the pressure side of the pump is set to 7 bar and, under the prevailing concentration conditions, about 4 bar are measured on the suction side of the pump P1. The pressure loss of the system is thus 3 bar. After termination of the reaction by means of acetonitrile (stream 5), the reactor discharge is stirred with 600 ml/h of hot water (60° C.) (line 6) in a 1 l stirred flask R1. A sample of the reactor content (taken at C, path A set) is titrated in aqueous phase with ethanolic KOH using phenolphthalein as an indicator until the pink color is visible for 10 minutes. An acid number of 2.6 is thus measured.

To establish a steady-state equilibrium in the polymerization reactor, the stirred flask is disharged after 2 hours and a sample is collected over a period of one hour, the aqueous phase of this sample is separated and the organic phase is worked up by distillation. The distillation is continued at 230° C. until a pressure of 2 $mbar_{abs}$ is reached, the oligomer content of the distillate is determined by gas chromatography and the bottom product is characterized. The amount of terminal double bonds (vinylidene content) was determined using $^{13}$C-NMR by known methods and was found to be 88%. The viscosity at 100° C., measured in an Ubbelohde viscometer, was 203 mm$^2$/s, the molecular weight $M_N$ was 1005, as determined by GPC, and the molecular weight distribution D was 1.5. The bromine number is 16.0, and the polymer yield is 97%.

At this time, a post-reactor as described in WO 96/40808 in the form of a stainless steel capillary having an internal diameter of 2 mm and a length of 5 m (W2) and a flooded 400 ml stainless steel tank B1 having an inlet via a tube inserted into the tank bottom and upper and lower outlets are started up downstream of the pressure regulation means and under the conditions described above. To this end, the path via line A is closed and the path is set via line B. Both devices are immersed into the same cooling bath as the main reactor. A Teflon filter having a pore diameter of 0.2 μm is located in the upper exit of the tank B1, whereas the lower exit leads to a pump which is able to recycle materials into the main reactor. The pressure regulation at the exit of the main reactor is reduced by 1 bar, and the termination using acetonitrile is omitted. Now the tank B1 fills up. The reaction proceeds in the tank B1, and a temperature rise of 4° C. is observed, with the isobutene conversion rising to 99.4%. After about 45 minutes, the tank B1 is full, and a sample is taken in the stirred flask R1 and worked up as described above.

This gives a polymer yield of 95%, a bromine number of 16, an $M_N$ of 998, a molecular weight distribution of 1.5 and a reactivity of 87%, i.e. only minor variations, if any, compared with the original procedure. However, the acid number of the feed to the stirred flask (sampling at C) is only 0.2. This corresponds to 92% separation of the complex remaining in the tank B1. It contains about 20% of water and is drained off.

At this point, the complex recycle pump P2 is switched on at a rate of 2.5 ml/h, which inevitably leads to a small amount of the organic phase being recycled, because the amount is considerably larger than the amount of complex separated. At the same time, the $BF_3$ feed is reduced to 1 mmol/h and the isopropanol feed is reduced to 0.4 mmol/h. The increased amount of $BF_3$ is necessary to keep the reaction going so that the isobutene conversions in the main reactor, the post-reactor and the tank B1 remain constant. The product data remain constant, the polymer yield is reduced to 94%.

EXAMPLE 2

The experiment is conducted as described in Example 1, except that the post-reactor W2 is replaced by a flash vessel having a volume of 200 ml and operated at 20 $mbar_{abs}$. The vapors are condensed by means of a dry ice cooler and recycled into the main reactor by a pump, and the feed of fresh hexane is reduced by 20 ml. The flash vessel bottoms are pumped into the tank B1 where the complex is separated as described above. The acid number of the crude product obtained is 0.1, the polymer yield rises again to 96%, and the polymer properties are virtually the same as in the procedure without post-reactor W2 as described in Example 1.

EXAMPLE 3

The procedure described in Example 1 is repeated, except that methanol/water is used as complexing agent. The reactor is fed with a mixture of 5 mmol each to obtain similar conversions in the main reactor and the post-reactor W2. In the steady state, the isobutene conversion obtained is 90% when path A is set. Downstream of the filter exit B1 via path B, the acid number is only <0.1, i.e. the separation rate is more than 95%. Washing and distillation yields a polymer having a vinylidene double bond content of 83% and a polymer yield of 94%, an $M_N$ of 1010, a molecular weight distribution of 1.6 and a viscosity of 218 mm$_2$ [sic]/s.

Then the complex recycle system as described in Example 1 is started. After one minute, water and methanol feeds are turned off and a feed of about 1 mmol of $BF_3$ is continued to maintain an isobutene conversion of 90%. The properties of the product remain constant after a further 16 h of operating time.

We claim:

1. A process for preparing low molecular weight, highly reactive polyisobutylene having an average molecular weight $M_n$ ranging from 500 to 5000 Dalton and a terminal double bond content of more than 80 mol % by polymerization in the liquid phase of isobutene or hydrocarbon streams comprising isobutene with the aid of a boron trifluoride complex catalyst which is a boron trifluoride complex or a complex mixture with water, methanol, ethanol, n- or isopropanol, 2-butanol or tert-butanol or the tert-butyl ethers thereof, at a temperature ranging from −40 to +20° C. and at a pressure ranging from 1 to 20 bar, which comprises:

a) polymerizing isobutene and optionally removing unreacted isobutene to provide a reaction medium having a content of unreacted isobutene of less than 2% by weight, based on the total amount of streams introduced, b) enriching the boron trifluoride complex catalyst which is present in the reaction medium in the form of droplets in the disperse and/or coherent phase, which forms as polymerization proceeds in step a);

c) separating a boron trifluoride complex-enriched phase from the reaction medium;

d) recycling the boron trifluoride complex-enriched phase to the polymerization phase of the process; and e) compensating for catalyst losses incurred by the separation and recycling of catalyst material by adding boron trifluoride to the polymerization medium.

2. The process according to claim 1, wherein, in the compensating step e), complexing agent is added to the boron trifluoride catalyst at the polymerization step to complex boron trifluoride.

3. The process according to claim 1, wherein the polymerization reaction is conducted mainly in the homogeneous phase.

4. The process according to claim 1, wherein the unreacted isobutene content of the reaction medium is less than 1% by weight.

5. The process according to claim 1, wherein a sparingly soluble boron trifluoride catalyst is added to the enriched boron trifluoride complex catalyst phase in order to increase separation of the catalyst.

6. The process according to claim 1, wherein the reaction mixture is cooled to increase separation of the boron trifluoride complex.

7. The process according to claim 1, wherein from 70 to 90% of the amount of catalyst complex separated from polymerization medium (a) is recycled to fresh starting isobutene polymerization medium.

8. The process according to claim 1, wherein the unreacted isobutene content in the polymerization reaction medium is controlled by flash evaporation under reduced pressure.

9. The process as claimed in claim 1, wherein the polymerization is conducted in multiple stages until the unreacted isobutene content is less than 1% by weight.

10. The process as claimed in claim 1, wherein the polymerization is conducted in two phases in an emulsion polymerization reaction.

11. The process as claimed in claim 1, wherein the unseparated portions of complex catalyst remaining after removal of the separated complex catalyst are deposited on nitrile-containing fibers or nitrile-modified support material, the catalyst is liberated from the fibers or support material by thermal treatment and the catalyst is recycled to the polymerization reaction medium.

12. The process as claimed in claim 1, wherein the boron trifluoride complex catalyst distributed in the polymerization mixture in dispersed form is separated by means of an electrostatic coalescer.

13. The process according to claim 1, wherein the polymerization reaction is conducted in multiple stages until the unreacted isobutene content is less than 1% by weight in the reaction medium.

* * * * *